United States Patent
Liu et al.

(10) Patent No.: US 10,649,288 B2
(45) Date of Patent: May 12, 2020

(54) LIQUID CRYSTAL DISPLAY PANEL, LIQUID CRYSTAL DISPLAY DEVICE AND CONTROL METHOD THEREOF

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Hanqing Liu, Beijing (CN); Bin Li, Beijing (CN); Pengju Zhang, Beijing (CN); Xuchen Yuan, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/088,309

(22) PCT Filed: Mar. 7, 2018

(86) PCT No.: PCT/CN2018/078299
§ 371 (c)(1),
(2) Date: Sep. 25, 2018

(87) PCT Pub. No.: WO2018/171431
PCT Pub. Date: Sep. 27, 2018

(65) Prior Publication Data
US 2019/0146289 A1 May 16, 2019

(30) Foreign Application Priority Data
Mar. 21, 2017 (CN) .......................... 2017 1 0171020

(51) Int. Cl.
*G02F 1/1343* (2006.01)
*G02F 1/1333* (2006.01)

(52) U.S. Cl.
CPC .... *G02F 1/134363* (2013.01); *G02F 1/13439* (2013.01); *G02F 2001/133397* (2013.01); *G02F 2201/501* (2013.01)

(58) Field of Classification Search
CPC ... G02F 2001/133397; G02F 2201/501; G02F 1/13768; G02F 1/137; G02F 1/0138;
(Continued)

(56) References Cited

U.S. PATENT DOCUMENTS

2014/0139796 A1 3/2014 Cao et al.
2018/0107081 A1 4/2018 Zhao et al.

FOREIGN PATENT DOCUMENTS

CN 1648737 A 8/2005
CN 101135818 A 3/2008
(Continued)

OTHER PUBLICATIONS

Chinese Office Action in corresponding Chinese Patent Application No. 201710171020.9 dated Apr. 9, 2019 (an English translation attached hereto). 14 pages.
International Search Report and Written Opinion in corresponding PCT Application No. PCT/CN2018/078299, dated May 30, 2018 (an English translation attached hereto).

*Primary Examiner* — Jessica M Merlin
(74) *Attorney, Agent, or Firm* — Leason Ellis LLP

(57) ABSTRACT

A liquid crystal display panel, a liquid crystal display device and a control method thereof are disclosed. The liquid crystal display panel includes a first base substrate, a second base substrate, and a liquid crystal layer provided between the first base substrate and the second base substrate. It further includes: a first electrode and a second electrode, the first electrode and the second electrode being both provided on one side of one of the first base substrate and the second (Continued)

base substrate close to the liquid crystal layer; the first electrode and the second electrode being configured for generating an electric field; and a conductor, located between the first electrode and the second electrode and is configured for generating a magnetic field whose magnetic field direction is perpendicular to a plane of the first base substrate and a plane of the second base substrate.

18 Claims, 6 Drawing Sheets

(58) Field of Classification Search
CPC ............... G02F 1/0081; G02F 1/0036; G02F 1/134363; G02F 1/13439
See application file for complete search history.

(56) References Cited

FOREIGN PATENT DOCUMENTS

| CN | 101650499 A | 2/2010 |
| CN | 101656051 A | 2/2010 |
| CN | 102998856 A | 3/2013 |
| CN | 103901675 A | 7/2014 |
| CN | 105044971 A | 11/2015 |
| CN | 105487312 A | 4/2016 |
| CN | 106896595 A | 6/2017 |
| KR | 100257907 B1 | 3/2000 |
| KR | 20080051234 A * | 6/2008 |
| KR | 20160023732 A | 3/2016 |

* cited by examiner

LIQUID CRYSTAL DISPLAY PANEL, LIQUID CRYSTAL DISPLAY DEVICE AND CONTROL METHOD THEREOF

CROSS-REFERENCE TO RELATED APPLICATIONS

The present application is a U.S. National Stage Application under 35 U.S.C. § 371 of International Patent Application No. PCT/CN2018/078299, filed Mar. 7, 2018, which claims priority of Chinese Patent Application No. 201710171020.9 filed on Mar. 21, 2017, the disclosures of which are incorporated herein by reference in their entireties.

TECHNICAL FIELD

Embodiments of the present disclosure relate to a liquid crystal display panel, a liquid crystal display device and a control method thereof.

BACKGROUND

Liquid crystal is a main material for a liquid crystal display device to implement a display function; and in normal industrial production, impurity ions in a liquid crystal layer may increase due to contamination in a carrying vessel, contamination during transportation, or excessively long time for fabricating the liquid crystal display device, and other uncontrollable factors. If there are relatively more free impurity ions in the liquid crystal layer during the display procedure, movement of the free impurity ions will directly affect a Flicker (FLK) value of the liquid crystal display device, resulting in a large FLK value, FLK value drift, or an image sticking, and other defects of the liquid crystal display device, which seriously affects a display effect of the liquid crystal display device.

SUMMARY

Embodiments of the present disclosure provide a liquid crystal display panel, a liquid crystal display device and a control method thereof, which reduces a concentration of free impurity ions in a liquid crystal layer.

In the first aspect of an embodiment, it is provided a liquid crystal display panel, comprising a first base substrate, a second base substrate, and a liquid crystal layer provided between the first base substrate and the second base substrate, the liquid crystal display panel further comprising: a first electrode and a second electrode, both being provided on a side of one of the first base substrate and the second base substrate close to the liquid crystal layer; the first electrode and the second electrode being configured for generating an electric field; and a conductor, located between the first electrode and the second electrode, the conductor being configured for generating a magnetic field, a magnetic field direction of the magnetic field being perpendicular to a plane of the first base substrate and a plane of the second base substrate.

In the second aspect of an embodiment, it is provided a liquid crystal display device which comprises the aforementioned liquid crystal display panel.

In the third aspect of an embodiment, it is provided a control method of the afore-mentioned liquid crystal display device, which comprises: inputting different voltage signals to the first electrode and the second electrode respectively, before the liquid crystal display device displays a picture, such that a potential difference is formed between the first electrode and the second electrode.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1A:
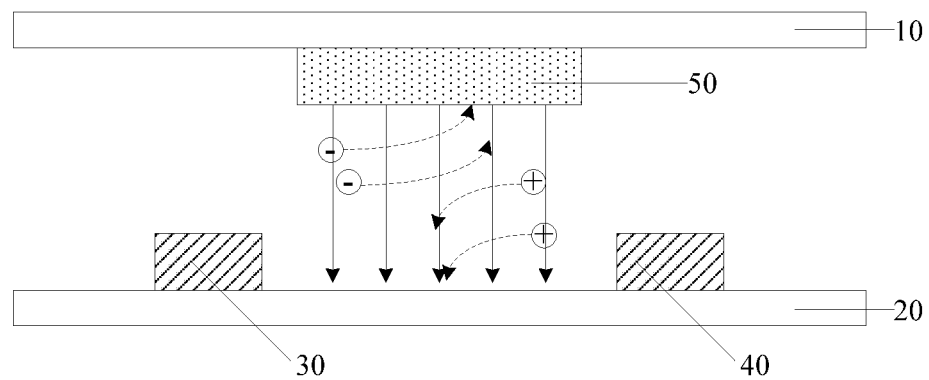
FIG. 1(a) is a structural schematic diagram of a liquid crystal display panel provided by an embodiment of the present disclosure.
Figure 1B:
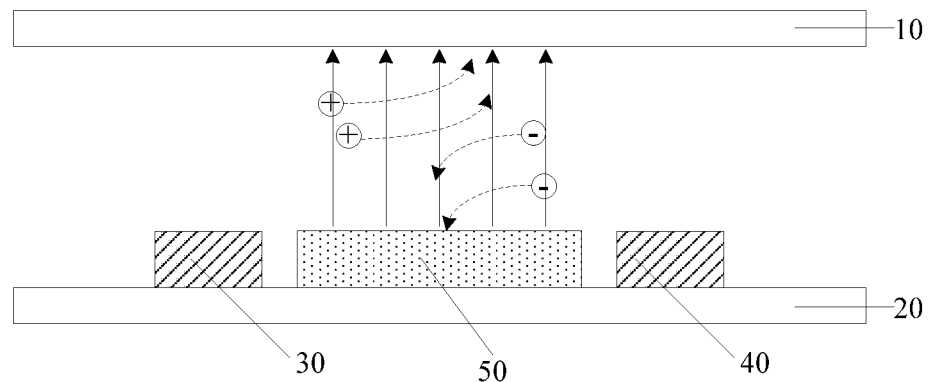
FIG. 1(b) is a structural schematic diagram of a liquid crystal display panel provided by another embodiment of the present disclosure.

An embodiment of the present disclosure provides a liquid crystal display panel, as illustrated in FIG. 1(a), FIG. 1(b) and FIG. 3, comprising a first base substrate 10, a second base substrate 20, and a liquid crystal layer (not illustrated) provided between the first base substrate 10 and the second base substrate 20. The liquid crystal display panel further comprises: a first electrode 30 and a second electrode 40, the first electrode 30 and the second electrode 40 being both provided on one side of one of the first base substrate 10 and the second base substrate 20 close to the liquid crystal layer, and the first electrode 30 and the second electrode 40 being configured for generating an electric field. The liquid crystal display panel further comprises a conductor 50, which is located between the first electrode 30 and the second electrode 40, and is configured for generating a magnetic field whose magnetic field direction is perpendicular to a plane of the first base substrate 10 and a plane of the second base substrate 20. The first base substrate 10 and the second base substrate 20 are arranged opposite to each other, so the two are parallel to each other.

In at least some embodiments, a conductor 50 is provided on a side of a first base substrate 10 close to a liquid crystal layer or provided on a side of a second base substrate 20 close to a liquid crystal layer.

Figure 3A:
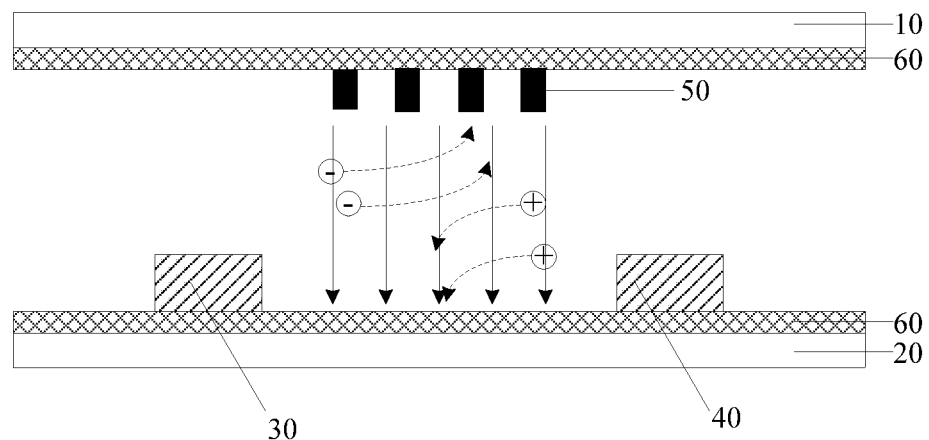
FIG. 3(a) is a structural schematic diagram of a liquid crystal display panel provided by still another embodiment of the present disclosure.

In at least some embodiments, a first electrode 30 and a second electrode 40 are located on a same bearing surface (for example, both are located on a same alignment layer 60 in FIG. 3(a)) and are in contact with the bearing surface.

In at least some embodiments, a first electrode 30, a second electrode 40 and a conductor 50 may be provided on different base substrates as illustrated in FIG. 1(a), or may also be provided on a same base substrate as illustrated in FIG. 1(b). In an embodiment, the first electrode 30, the second electrode 40 and the conductor 50 are provided on different base substrates. For example, the first electrode 30 and the second electrode 40 are provided on a first base substrate 10 while the conductor 50 is provided on a second base substrate 20, or the first electrode 30 and the second electrode 40 are provided on the second base substrate 20 while the conductor 50 is provided on the first base substrate 10. In an embodiment, the first electrode 30, the second electrode 40 and the conductor 50 are provided on a same base substrate. For example, the first electrode 30, the second electrode 40 and the conductor 50 are simultaneously provided on the first base substrate 10 or simultaneously provided on the second base substrate 20.

In at least some embodiments, different voltages may be applied to a first electrode 30 and a second electrode 40, to create a potential difference therebetween, such that an electric field will be generated between the first electrode 30 and the second electrode 40. Herein, an electric field direction is related to the voltage applied to the first electrode 30 and the second electrode 40, and the electric field direction is directed from a high voltage to a low voltage. Because the first electrode 30 and the second electrode 40 are located on a same bearing surface, a transverse electric field may be generated between the first electrode 30 and the second electrode 40.

Herein, "the first electrode 30 and the second electrode 40 are located on the same bearing surface" refers to that the first electrode 30 and the second electrode 40 are in contact with a same film layer.

In at least some embodiments, a type of a conductor 50 will not be limited, as long as a magnetic field whose magnetic field direction is perpendicular to a plane of a first base substrate 10 (or a plane of a second base substrate 20) may be generated. The conductor 50 may be, for example, a pattern formed of a material having a magnetic property, and may also be a spiral coil.

For example, the magnetic field direction of the magnetic field generated by the conductor 50 may be a direction perpendicular to the plane of the first base substrate 10, and directed from the first base substrate 10 to the second base substrate 20 as illustrated in FIG. 1(a), and may also be a direction perpendicular to the plane of the first base substrate 10, and directed from the second base substrate 20 to the first base substrate 10 as illustrated in FIG. 1(b).

In the liquid crystal display panel, the first base substrate 10 and the second base substrate 20 are usually parallel to each other, and thus, the magnetic field direction is perpendicular to the first base substrate 10, that is, the magnetic field direction is perpendicular to the second base substrate 20.

In at least some embodiments, a conductor 50 is located between a first electrode 30 and a second electrode 40, for example, as illustrated in FIG. 1(b), the first electrode 30, the second electrode 40 and the conductor 50 are provided on a same base substrate. Alternatively, as illustrated in FIG. 1(a), the first electrode 30, the second electrode 40 and the conductor 50 are provided on different base substrates, in which case it may be considered that the conductor 50 is located between the first electrode 30 and the second electrode 40, as long as a projection of the conductor 50 is located between the first electrode 30 and the second electrode 40 while the conductor 50 is projected on the base substrate where the first electrode 30 and the second electrode 40 are located.

In at least some embodiments, the drawings of the present disclosure merely illustrate structures most relevant to the present disclosure, and other unillustrated structures are not meant to be absent in an actual product. For example, a liquid crystal display panel comprises not only a first base substrate 10, a second base substrate 20 and a liquid crystal layer, but also a thin film transistor, a pixel electrode, a common electrode, a color film layer, and the like, herein, the thin film transistor and the pixel electrode are provided on a same base substrate, the common electrode and the color film layer may be provided on a base substrate the same as the thin film transistor and the pixel electrode, and may also be provided on a different base substrate.

In at least some embodiments, in a case that a first base substrate 10 and a second base substrate 20 further include other film layer, the positions of a first electrode 30, a second electrode 40 and a conductor 50 are not limited to the present disclosure, they may be provided between the other film layer and a base substrate, and may also be provided at a position of the base substrate closest to a liquid crystal layer. As an example, in a case that the first electrode 30 and the second electrode 40 are provided on the first base substrate 10 and the first base substrate 10 is further provided thereon with a color film layer, at this time, the first electrode 30 and the second electrode 40 may be provided between the first base substrate 10 and the color film layer, or they may also be provided on a side of the color film layer away from the first base substrate 10. In the embodiment of the present disclosure, the first electrode 30, the second electrode 40 and the conductor 50 are provided on a side of the first base substrate 10 or the second base substrate 20 close to the liquid crystal layer, and are provided at a position closest to the liquid crystal layer.

In at least some embodiments, a display region of a liquid crystal display panel comprises a plurality of light-transmitting regions and a light-blocking region surrounding the light-transmitting region, and a first electrode 30, a second electrode 40 and a conductor 50 may be provided in the light-transmitting region of the liquid crystal display panel, or may also be provided in the light-blocking region of the liquid crystal display panel. In a case that they are provided in the light-transmitting region, it should be ensured that normal display of the liquid crystal display panel is not affected, for example, before the liquid crystal display panel displays a picture, free ions in a liquid crystal layer may be fixed with an electric field generated by the first electrode 30 and the second electrode 40 and a magnetic field generated by the conductor 50.

An embodiment of the present disclosure provides a liquid crystal display panel, and the liquid crystal display panel comprises the first electrode 30 and the second electrode 40. Because the first electrode 30 and the second electrode 40 are capable of generating the transverse electric field, impurity ions in the liquid crystal layer will move under the transverse electric field. In addition, the liquid crystal display panel further comprises the conductor 50 located between the first electrode 30 and the second electrode 40, and the magnetic field direction of the conductor 50 is perpendicular to the plane of the first base substrate, in this way, the moving impurity ions will move into the magnetic field generated by the conductor 50 under the electric field, and the impurity ions will move close to the first base substrate 10 or the second base substrate 20 at a certain speed under an action of a magnetic field force, so as to collide with the film layer close to the liquid crystal layer. As a result, the impurity ions are fixed onto the two film layers close to the liquid crystal layer, so that the concentration of the free ions in the liquid crystal layer can be reduced, which avoids a large FLK value, FLK value drift, or an image sticking, and other defects, and increases a display effect of the liquid crystal display panel.

In at least some embodiments, a conductor 50 is located on another base substrate which is different from a base substrate on which a first electrode 30 and a second electrode 40 is located. For example, as illustrated in FIG. 1(a), the conductor 50 may be provided on a first base substrate 10, while the first electrode 30 and the second electrode 40 may be provided on a second base substrate 20. Alternatively, the conductor 50 may also be provided on the second base substrate 20, while the first electrode 30 and the second electrode 40 are provided on the first base substrate 10.

In the embodiment of the present disclosure, the conductor 50 is provided on another base substrate different from a base substrate on which the first electrode 30 and the second electrode 40 is located, which prevents the magnetic field generated by the conductor 50 and the electric field generated by the first electrode 30 and the second electrode 40 from affecting each other.

Figure 2:
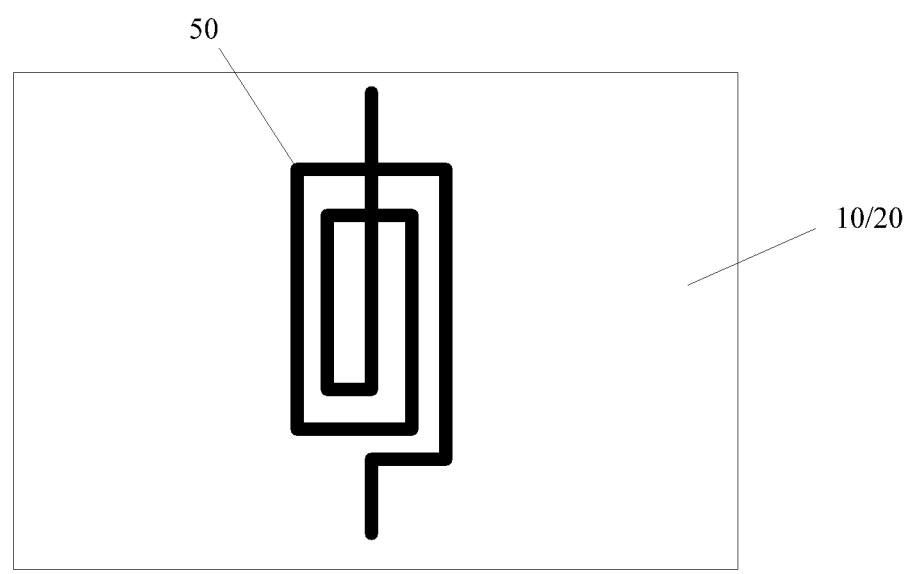
FIG. 2 is a structural schematic diagram of a conductor being a spiral coil provided by the embodiment of the present disclosure.

For example, as illustrated in FIG. 2, the conductor 50 is a spiral coil.

It should be noted that, because a current flows through the spiral coil when the spiral coil is in use, each end of the spiral coil is connected with a current terminal; in design, an end of the spiral coil in the middle of the spiral coil passes through a plurality of loops so as to connect with the current terminal. At this time, the spiral coil is equivalent to a small electromagnet, and the portion of the spiral coil that passes through the plurality of loops is equivalent to a small iron core; in the case that a current is supplied to the spiral coil, the spiral coil generates a magnetic field, and a magnetic field direction is perpendicular to the spiral coil according to Ampere's rule, that is, the magnetic field direction is perpendicular to the plane of the first base substrate 10 or the second base substrate 20.

Here, the magnetic field direction may be changed, by changing a direction of the current supplied to the spiral coil.

In the embodiment of the present disclosure, the number of loops of the spiral coil will not be limited, and the number of loops of the spiral coil may be set according to actual requirements. On such basis, a magnitude of the magnetic field generated by the spiral coil may be adjusted, by adjusting the number of loops of the spiral coil and a magnitude of the current flowing through the spiral coil.

In the embodiment of the present disclosure, the spiral coil is inexpensive, and its production process is simple. In addition, the magnitude of the magnetic field generated by the spiral coil may be adjusted by changing the number of loops of the spiral coil and the magnitude of the current flowing through the spiral coil, and the magnetic field direction may be adjusted by changing the direction of the current supplied to the spiral coil, which is relatively convenient and simple, so the spiral coil is used as an example of the conductor 50 according to the embodiment of the present disclosure.

Figure 3B:
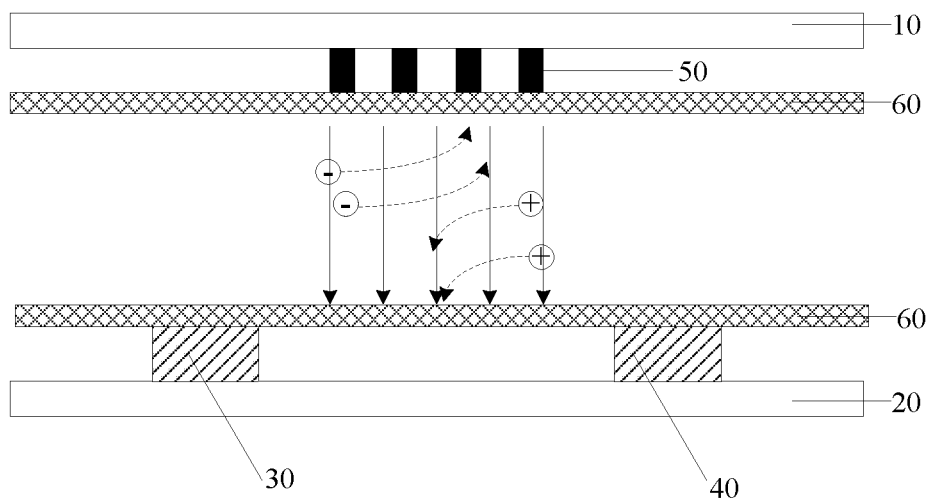
FIG. 3(b) is a structural schematic diagram of a liquid crystal display panel provided by a further embodiment of the present disclosure.

For example, as illustrated in FIG. 3(a) and FIG. 3(b), the liquid crystal display panel further comprises an alignment film 60 provided on both sides of the liquid crystal layer. It should be noted that, it is illustrated in FIG. 3(a) and FIG. 3(b) with a case where the conductor 50 is a spiral coil as an example. The alignment film 60 is configured for aligning liquid crystals according to a certain orientation.

As illustrated in FIG. 3(a), the first electrode 30, the second electrode 40 and the conductor 50 may all be provided on a side of the alignment film 60 close to the liquid crystal layer; or, they may also be provided on a side of the alignment film 60 away from the liquid crystal layer, as illustrated in FIG. 3(b). In other embodiments, a first electrode 30 and a second electrode 40 are provided on a side of an alignment film 60 close to a liquid crystal layer, and a conductor 50 is provided on a side of the alignment film 60 away from the liquid crystal layer; or, the first electrode 30 and the second electrode 40 are provided on the side of the alignment film 60 away from the liquid crystal layer, and the conductor 50 is provided on the side of the alignment film 60 close to the liquid crystal layer (not illustrated). Based on the above description, in order to enable more impurity ions in the liquid crystal layer to be fixed onto the alignment film 60, as illustrated in FIG. 3(b), the first electrode 30, the second electrode 40 and the conductor 50 are all provided on the side of the alignment film 60 away from the liquid crystal layer.

In the embodiment of the present disclosure, the alignment film 60 is provided on both sides of the liquid crystal layer, when the free ions collide with the alignment film 60 at a certain speed under the magnetic field generated by the conductor 50 and the electric field generated by the first electrode 30 and the second electrode 40, the ions may be firmly fixed onto the alignment film 60 due to a groove on the alignment film 60, so that ions may be prevented from returning to the liquid crystal layer.

Figure 4A:
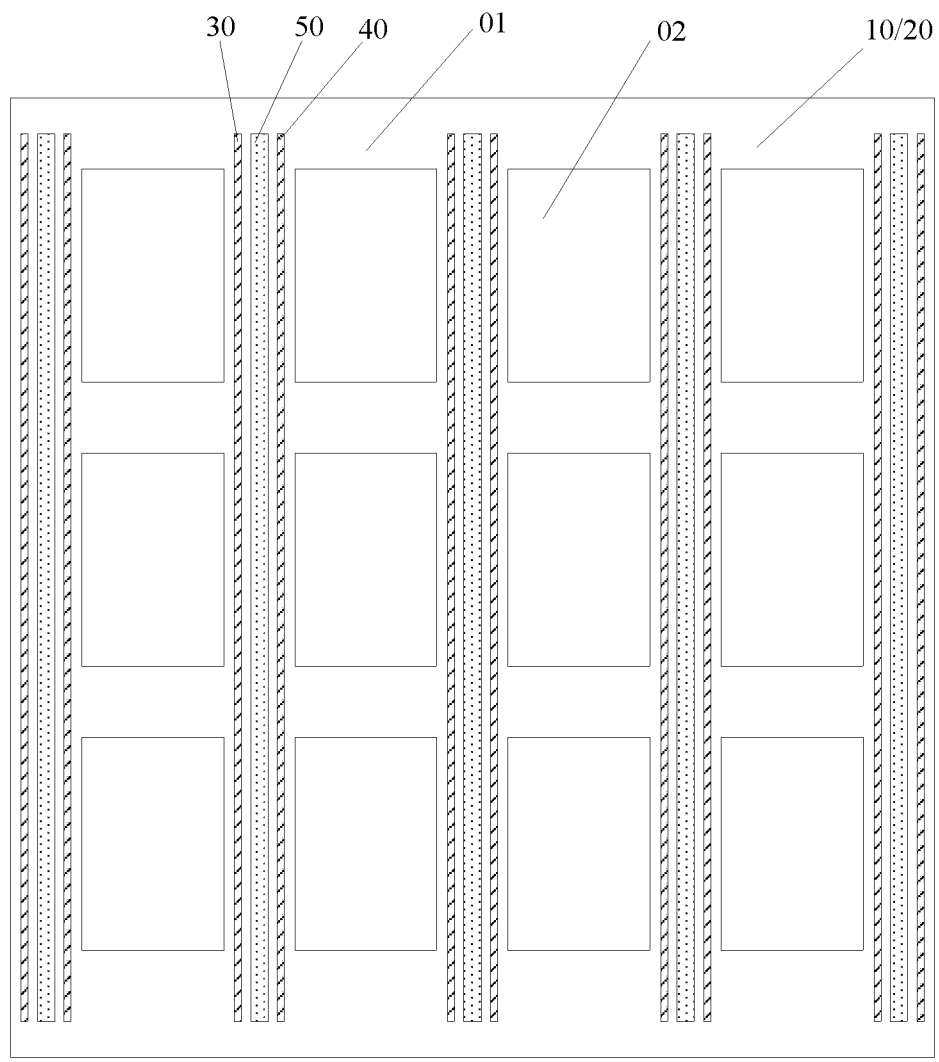
FIG. 4(a) is a structural schematic diagram of arranging a plurality of conductors, a plurality of first electrodes and a plurality of second electrodes on a first base substrate or a second base substrate provided by an embodiment of the present disclosure.
Figure 4B:
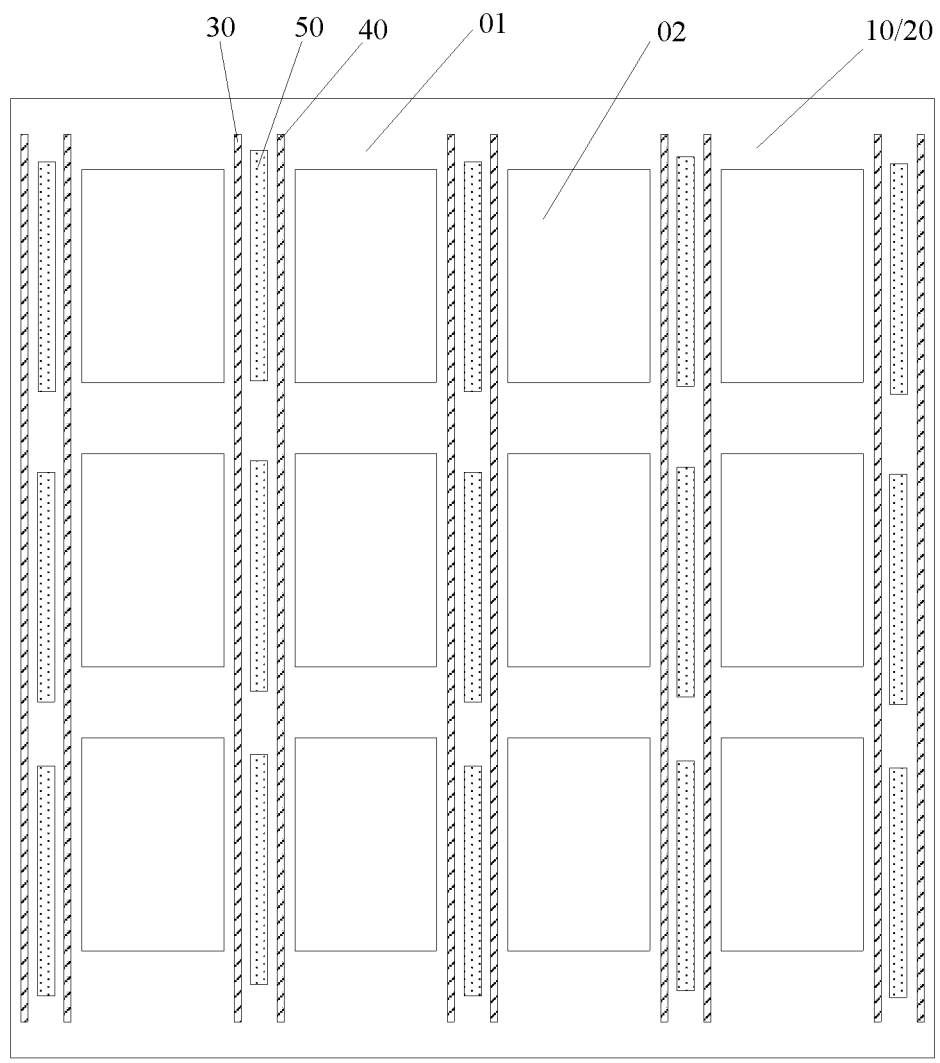
FIG. 4(b) is a structural schematic diagram of arranging a plurality of conductors, a plurality of first electrodes and a plurality of second electrodes on a first base substrate or a second base substrate provided by another embodiment of the present disclosure.
Figure 4C:
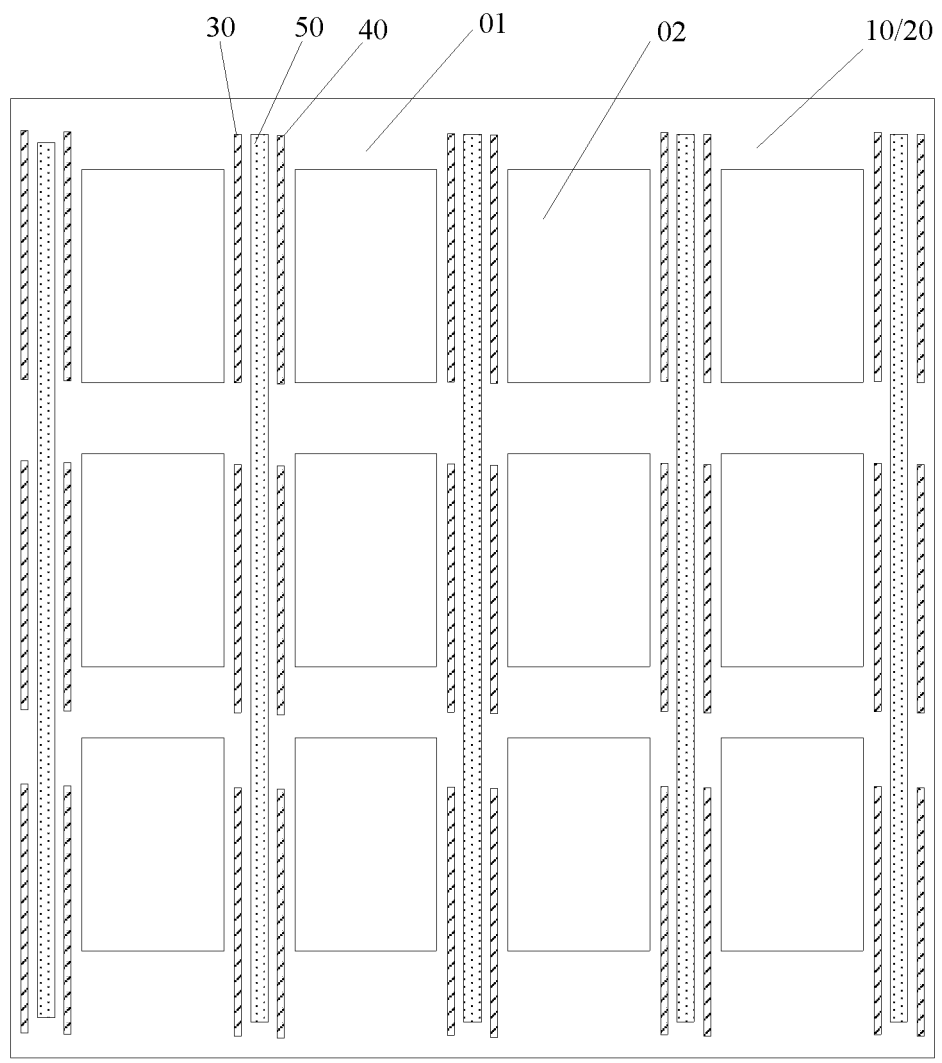
FIG. 4(c) is a structural schematic diagram of arranging a plurality of conductors, a plurality of first electrodes and a plurality of second electrodes on a first base substrate or a second base substrate provided by still another embodiment of the present disclosure.

For example, as illustrated in FIG. 4(a), FIG. 4(b) and FIG. 4(c), the first electrode 30, the second electrode 40 and the conductor 50 are provided in the light-blocking region 01 of the liquid crystal display panel. The display region of the liquid crystal display panel comprises a light-blocking region 01 and the light-transmitting region 02, and the light-transmitting region 02 is configured for displaying an image. The first electrode 30, the second electrode 40 and the conductor 50 are all provided between any two adjacent light-transmitting regions 02.

FIG. 4(a), FIG. 4(b) and FIG. 4(c) illustrate with a case where the first electrode 30, the second electrode 40 and the conductor 50 are provided on a same base substrate as an example, but it is not limited thereto.

In the embodiment of the present disclosure, the first electrode 30, the second electrode 40 and the conductor 50 are provided in the light-blocking region 01, so that it is possible to avoid affecting normal display of the liquid crystal display panel on the one hand, and avoid reducing transmittance of light on the other hand.

Figure 5:
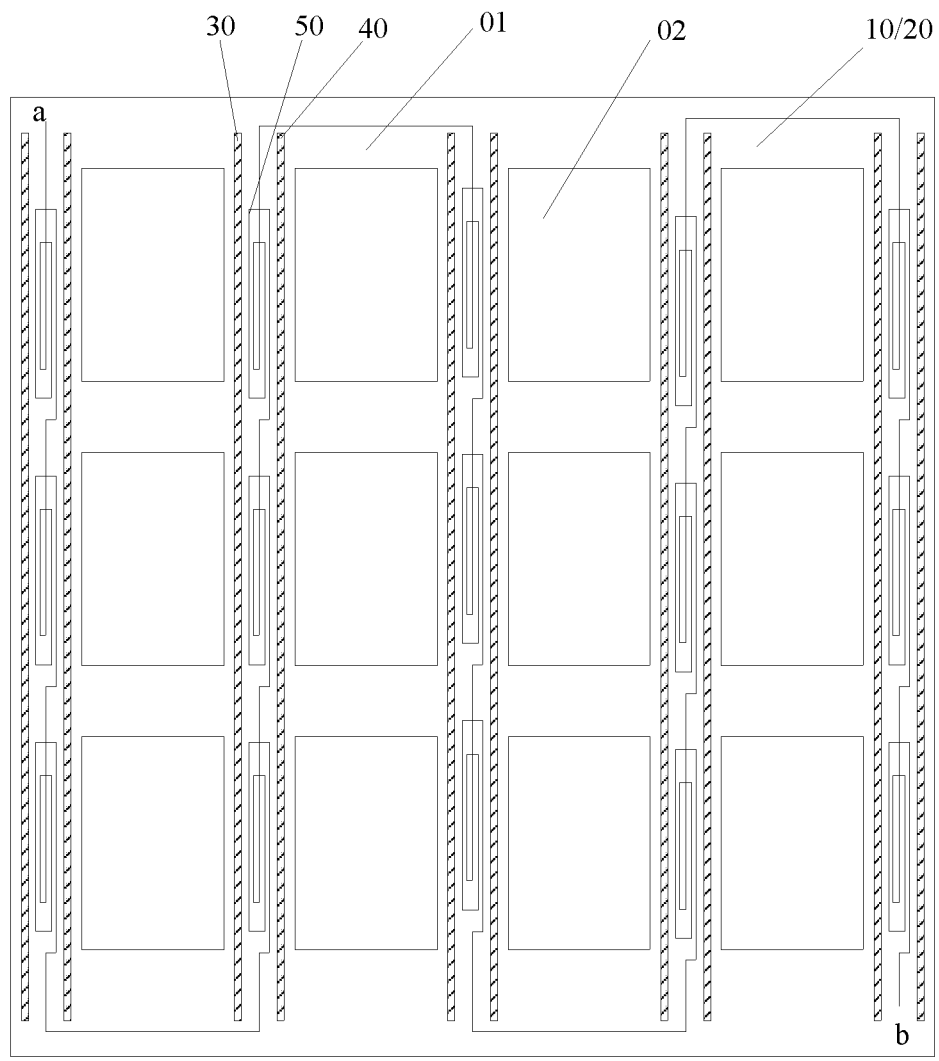
FIG. 5 is a structural schematic diagram of a plurality of spiral coils connected with one another in series provided by the embodiment of the present disclosure.

For example, as illustrated in FIG. 4(a), FIG. 4(b) and FIG. 5, the first base substrate 10 or the second base substrate 20 is provided thereon with a plurality of data lines sequentially arranged in a column direction; the first electrode 30 is an odd-column data line, and the second electrode 40 is an even-column data line. In the embodiment of the present disclosure, two data lines are provided between two adjacent light-transmitting regions 02.

In the embodiment of the present disclosure, when the first electrode 30 and the second electrode 40 are required to generate the electric field, different voltages are input to the odd-column data line and the even-column data line, and at this time, the odd-column data line and the even-column data line will generate the electric field. Here, those skilled in the art should understand that, when the electric field is generated between the odd-column data line and the even-column data line, normal display of the liquid crystal display panel should not be affected at this time.

In the embodiment of the present disclosure, the odd-column data line serves as the first electrode 30, and the even-column data line serves as the second electrode 40, so that a fabrication process of the liquid crystal display panel may be simplified, without additionally providing the first electrode 30 and the second electrode 40.

For example, as illustrated in FIG. 4(a), FIG. 4(b) and FIG. 4(c), the liquid crystal display panel comprises a plurality of conductors 50, as well as a plurality of strip-shaped first electrodes 30 and a plurality of strip-shaped second electrodes 40 uniformly distributed on the first base substrate 10 or the second base substrate 20. Here, the term "uniformly distributed" refers to that the plurality of first electrodes 30 are equally spaced, and/or the plurality of second electrodes 40 are equally spaced, and/or the plurality of conductors 50 are equally spaced. A distance from a projection of the first electrode 30 on the base substrate to a projection of the conductor 50 on a same base substrate is equal to a distance from a projection of the second electrode 40 on the base substrate to a projection of the conductor 50 on a same base substrate.

In the case that the first base substrate 10 or the second base substrate 20 comprises the plurality of conductors 50 as well as the plurality of strip-shaped first electrodes 30 and the plurality of strip-shaped second electrodes 40, one of conductors 50 may be provided between one first electrode 30 and one second electrode 40, as illustrated in FIG. 4(a); or a plurality of conductors 50 may be provided between one first electrode 30 and one second electrode 40, as illustrated in FIG. 4(b); or, one of conductors 50 may be provided between each pair which consisting of one first electrode 30 and one second electrode 40 as illustrated in FIG. 4(c).

On this basis, when the conductor 50 is a spiral coil, the plurality of conductors 50 may be connected with each other in series, or may not be connected with each other. Further, the plurality of first electrodes 30 may be connected with each other, or may not be connected with each other; and the plurality of second electrodes 40 may be connected with each other, or may not be connected with each other. When the first electrode 30 and the second electrode 40 are data lines, those skilled in the art should understand that, the plurality of first electrodes 30 are not connected with each other, and the plurality of second electrodes 40 are not connected with each other.

In the embodiment of the present disclosure, the plurality of conductors 50, the plurality of strip-shaped first electrodes 30, and the plurality of strip-shaped second electrodes 40 are uniformly distributed on the first base substrate 10 or the second base substrate 20, so that the ions in the liquid crystal layer are uniformly fixed, which may ensure uniform concentration of the free ions in the entire liquid crystal layer, and further ensure uniform performance of the liquid crystal display panel.

In the case that the liquid crystal display panel comprises a plurality of conductors 50 and the conductor 50 is a spiral coil, if the plurality of spiral coils are not connected with each other, both ends of each spiral coil are connected with the current terminal to form a loop, such that each spiral coil can generate a magnetic field. However, this configuration renders the fabrication process of the liquid crystal display panel more complicated. In the embodiment of the present disclosure, as illustrated in FIG. 5, the conductor 50 is a spiral coil, and the plurality of spiral coils are connected with each other in series. In order to make each spiral coil generates a magnetic field, only two unconnected ends of the plurality of spiral coils (illustrated by points a and b in FIG. 5) are connected with the current terminals; in this way, a current passes through each spiral coil, and each spiral coil generates a magnetic field, which simplifies the fabrication process of the liquid crystal display panel.

An embodiment of the present disclosure further provides a liquid crystal display device, comprising the above-described liquid crystal display panel.

In at least some embodiments, a liquid crystal display device further comprises a control circuit; the control circuit comprises a first voltage output terminal and a second voltage output terminal, the first voltage output terminal being electrically connected with a first electrode 30, and the second voltage output terminal being electrically connected with a second electrode 40; herein, a potential difference is formed between a voltage of the first voltage output terminal and a voltage of the second voltage output terminal.

The liquid crystal display device provided by the embodiment of the present disclosure may be any device that displays an image regardless of a text or a picture, no matter whether it is dynamic (for example, a video) or stationary (for example, a stationary picture). More specifically, the embodiment may be implemented in or associated with a variety of electronic devices, which, for example, include, but are not limited to, mobile phones, wireless devices, personal data assistants (PDAs), handheld or portable computers, GPS receivers/navigators, cameras, MP4 video players, video cameras, game consoles, watches, clocks, calculators, television monitors, flat panel displays, computer monitors, automobile displays (for example, odometer displays, and the like), navigators, cockpit controllers and/or displays, camera view displays (for example, vehicles' rear view camera displays), electronic photos, electronic billboards or destination boards, projectors, building structures, packaging and aesthetic structures (for example, displays for displaying an image of jewelry), and the like.

In the embodiment of the present disclosure, because the first voltage output terminal is electrically connected with the first electrode 30, the first voltage output terminal supplies a voltage to the first electrode 30. Because the second voltage output terminal is electrically connected with the second electrode 40, the second voltage output terminal supplies a voltage to the second electrode 40. On this basis, because a potential difference is formed between the voltage of the first voltage output terminal and the voltage of the second voltage output terminal, the voltages on the first electrode 30 and the second electrode 40 are different from each other, and an electric field is generated between the first electrode 30 and the second electrode 40. Free impurity ions in the liquid crystal layer moves under the electric field. Because the liquid crystal display panel further comprises the conductor 50 which is located between the first electrode 30 and the second electrode 40, and a magnetic field direction of the conductor 50 is perpendicular to a plane of the first base substrate 10, the moving impurity ions may move to the magnetic field generated by the conductor 50 under the electric field. The impurity ions moves toward the first base substrate 10 or the second base substrate 20 at a certain speed under a magnetic field force, so as to collide with the film layer close to the liquid crystal layer, and further, the impurity ions are fixed onto the two film layers close to the liquid crystal layer, so that a concentration of free ions in the liquid crystal layer can be reduced.

In at least some embodiments, a control circuit further comprises a pair of current terminals; the conductor 50 is a spiral coil, and the pair of current terminals are respectively electrically connected with both ends of the spiral coil.

For example, a pair of current terminals are respectively electrically connected with both ends of the spiral coil, to form a loop. One of the pair of current terminals is configured for inputting a current to the spiral coil, and the other is configured for enabling a current in the spiral coil to flow into the current terminal, so that a loop may be formed.

In the embodiment of the present disclosure, because the control circuit further comprises a pair of current terminals and the pair of current terminals are respectively electrically connected with both ends of the spiral coil, a current flows through the spiral coil, and the spiral coil can generate a magnetic field perpendicular to the first base substrate 10 or the second base substrate 20.

An embodiment of the present disclosure further provides a control method of the above-described liquid crystal display device, comprising: inputting voltage signals of different magnitudes to a first electrode and a second electrode respectively, before the liquid crystal display device displays a picture (or, which may be understood as, after displaying one frame of picture and before displaying a next frame of picture), so as to form a potential difference between the first electrode and the second electrode.

Herein, voltage signals of different magnitudes are input to the first electrode and the second electrode respectively, so an electric field can be generated between the first electrode 30 and the second electrode 40, and an electric field line direction is directed from a high voltage to a low voltage.

In the embodiment of the present disclosure, because the voltage signals are input to the first electrode 30 and the second electrode 40 before the liquid crystal display device displays a picture, normal display of the liquid crystal display device cannot be affected. On such basis, an electric field is generated between the first electrode 30 and the second electrode 40, and free impurity ions in a liquid crystal layer moves under the electric field. Because the liquid crystal display panel further comprises a conductor 50 located between the first electrode 30 and the second electrode 40, and a magnetic field direction of the conductor 50 is perpendicular to a plane of the first base substrate 10, the moving impurity ions moves to a magnetic field generated by the conductor 50 under the electric field. The impurity ions moves toward the first base substrate 10 or the second base substrate 20 at a certain speed under a magnetic field force, so as to collide with the film layer close to the liquid crystal layer, and further, the impurity ions are fixed onto the two film layers close to the liquid crystal layer, so that a concentration of free ions in the liquid crystal layer can be reduced.

In at least some embodiments, a conductor 50 is a spiral coil, and a control method further comprising: inputting a current signal to the spiral coil.

Herein, a magnitude and a direction of a current flowing through the spiral coil will not be limited, which may be adjusted according to actual requirements. Herein, a magnetic field direction of a magnetic field generated by the spiral coil is related to a direction of the current flowing through the spiral coil.

In the embodiment of the present disclosure, when a current signal is input to the spiral coil, the spiral coil generates a magnetic field whose magnetic field direction is perpendicular to a plane of the first base substrate 10 or a plane of the second base substrate 20.

In the liquid crystal display panel, the liquid crystal display device and the control method thereof according to the above-described embodiments, because the liquid crystal display panel comprises the first electrode and the second electrode, and the first electrode and the second electrode are capable of generating the transverse electric field, the free impurity ions in the liquid crystal layer can move under the transverse electric field; in addition, the liquid crystal display panel further comprises the conductor located between the first electrode and the second electrode, and the magnetic field direction of the conductor is perpendicular to the first base substrate, so the moving impurity ions moves toward the magnetic field generated by the conductor under the electric field. The impurity ions moves in a direction close to the first base substrate or the second base substrate at a certain speed under the magnetic field force, so as to collide with the film layer close to the liquid crystal layer, and further, the impurity ions are fixed onto the two film layers close to the liquid crystal layer, so that the concentration of free ions in the liquid crystal layer can be reduced, which avoids a large FLK value, FLK value drift, or an image sticking, and other defects, and increases the display effect of the liquid crystal display panel.

In the disclosure, the following should be noted:

(1) The drawings of the embodiments of the present disclosure relate only to the structures involved in the embodiments of the present disclosure, and normal designs may be referred to for other structures.

(2) For the sake of clarity, in the drawings configured for describing the embodiments of the present disclosure, thicknesses of layers or regions are enlarged or reduced, that is, these drawings are not drawn in an actual scale.

(3) In case of no conflict, the embodiments of the present disclosure and the features in the embodiments may be combined with each other to obtain a new embodiment.

What is described above is related to the illustrative embodiments of the disclosure only and not limitative to the scope of the disclosure; the scopes of the disclosure are defined by the accompanying claims.

The invention claimed is:

1. A liquid crystal display panel, comprising:
a first base substrate;
a second base substrate; and
a liquid crystal layer, provided between the first base substrate and the second base substrate;
a first electrode and a second electrode, both being provided on a side of one of the first base substrate and the second base substrate close to the liquid crystal layer; the first electrode and the second electrode being configured for generating an electric field; and
a conductor, located between the first electrode and the second electrode, the conductor being a spiral coil and being configured for generating a magnetic field, a magnetic field direction of the magnetic field being perpendicular to a plane of the first base substrate and a plane of the second base substrate.

2. The liquid crystal display panel according to claim 1, wherein the conductor is provided on a side of one of the first base substrate and the second base substrate close to the liquid crystal layer.

3. The liquid crystal display panel according to claim 1, wherein the first electrode and the second electrode are located on a same bearing surface and are in contact with the bearing surface.

4. The liquid crystal display panel according to claim 1, wherein the conductor is provided on a base substrate different from a base substrate where the first electrode and the second electrode is located.

5. The liquid crystal display panel according to claim 1, wherein the liquid crystal display panel comprises a plurality of light-transmitting regions and a light-blocking region surrounding the plurality of light-transmitting regions.

6. The liquid crystal display panel according to claim 5, wherein the first electrode, the second electrode and the conductor are all provided in the light-blocking region of the liquid crystal display panel.

7. The liquid crystal display panel according to claim 5, wherein the first electrode, the second electrode and the conductor are provided between any two adjacent light-transmitting regions in the plurality of light-transmitting regions.

8. The liquid crystal display panel according to claim 1, wherein one of the first base substrate and the second base substrate is provided thereon with a plurality of data lines sequentially arranged in a column direction; the first electrode is an odd-column data line, and the second electrode is an even-column data line.

9. The liquid crystal display panel according to claim 7, wherein one of the first base substrate and the second base substrate is provided thereon with the plurality of data lines sequentially arranged in the column direction; the first electrode is an odd-column data line, and the second electrode is an even-column data line; and two data lines are provided between any two adjacent light-transmitting regions in the plurality of light-transmitting regions.

10. The liquid crystal display panel according to claim 1, wherein the conductor is one of a plurality of conductors, the first electrode is one of a plurality of strip-shaped first electrodes, the second electrode is one of a plurality of strip-shaped second electrodes; the plurality of conductors are uniformly distributed on one of the first base substrate and the second base substrate, the plurality of strip-shaped first electrodes are uniformly distributed on one of the first base substrate and the second base substrate, and the plurality of strip-shaped second electrodes are uniformly distributed on one of the first base substrate and the second base substrate.

11. A liquid crystal display device, comprising the liquid crystal display panel according to claim 1.

12. The liquid crystal display device according to claim 11, further comprising a control circuit, wherein the control circuit comprises a first voltage output terminal and a second voltage output terminal, the first voltage output terminal being electrically connected with the first electrode, and the second voltage output terminal being electrically connected with the second electrode;
wherein a potential difference is formed between a voltage of the first voltage output terminal and a voltage of the second voltage output terminal.

13. The liquid crystal display device according to claim 12, wherein the control circuit further comprises a pair of current terminals;
the pair of current terminals are respectively electrically connected with both ends of the spiral coil.

14. A control method of the liquid crystal display device according to claim 11, comprising:
inputting different voltage signals to the first electrode and the second electrode respectively, before the liquid crystal display device displays a picture, such that a potential difference is formed between the first electrode and the second electrode.

15. The control method according to claim 14, wherein the control method further comprises:
inputting a current signal to one end of the spiral coil.

16. The liquid crystal display panel according to claim 2, wherein the first electrode and the second electrode are located on a same bearing surface and are in contact with the bearing surface.

17. The liquid crystal display panel according to claim 2, wherein the conductor is provided on a base substrate different from a base substrate where the first electrode and the second electrode is located.

18. The liquid crystal display panel according to claim 3, wherein the conductor is provided on a base substrate different from a base substrate where the first electrode and the second electrode is located.

* * * * *